(12) United States Patent
Weder (10) Patent No.: US 6,269,590 B1
(45) Date of Patent: *Aug. 7, 2001

(54) FLORAL WRAPPER HAVING PRINTED DESIGN WITH SHADED AND HIGHLIGHTED AREAS

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/569,913

(22) Filed: May 11, 2000

Related U.S. Application Data (60) Continuation of application No. 09/374,464, filed on Aug. 13, 1999, now abandoned, which is a division of application No. 09/021,216, filed on Feb. 10, 1998, now abandoned.

(51) Int. Cl.[7] .................................................. A47G 7/08
(52) U.S. Cl. .......................................................... 47/72
(58) Field of Search .............................. 53/399, 397, 410; 47/58, 72; 206/45.33, 423; 283/94

(56) References Cited

U.S. PATENT DOCUMENTS

| | | |
|---|---|---|
| Re. 31,780 | 12/1984 | Cooper et al. . |
| D. 368,024 | 3/1996 | Sekerak et al. . |
| 2,240,072 | 4/1941 | Hoagdon et al. . |
| 2,774,187 | 12/1956 | Smithers . |
| 2,989,828 | 6/1961 | Warp . |
| 3,094,810 | 6/1963 | Kalpin . |
| 3,150,031 | 9/1964 | Powell . |
| 3,231,645 | 1/1966 | Bolomey . |
| 3,271,922 | 9/1966 | Wallerstein et al. . |
| 3,376,666 | 4/1968 | Leonard . |
| 3,481,663 | 12/1969 | Greenstein . |
| 3,508,372 | 4/1970 | Wallerstein et al. . |
| 3,549,405 | 12/1970 | Schrenk et al. . |
| 3,554,434 | 1/1971 | Anderson . |
| 3,616,192 | 10/1971 | Sinclair . |
| 3,749,629 | 7/1973 | Andrews et al. . |
| 3,865,664 | 2/1975 | Neumann . |
| 3,922,440 | 11/1975 | Wegwerth et al. . |
| 3,962,503 | 6/1976 | Crawford . |
| 4,068,030 | 1/1978 | Witman . |
| 4,333,267 | 6/1982 | Witte . |
| 4,400,910 | 8/1983 | Koustaal et al. . |
| 4,413,725 * | 11/1983 | Bruno et al. ............. 206/45.33 |
| 4,520,064 | 5/1985 | Kanzelberger . |
| 4,530,863 | 7/1985 | Seeger . |
| 4,699,820 | 10/1987 | Herr, Jr. et al. . |
| 4,786,533 | 11/1988 | Crass et al. . |
| 4,801,014 | 1/1989 | Meadows . |

(List continued on next page.)

FOREIGN PATENT DOCUMENTS

| | | |
|---|---|---|
| 1166692 | 3/1964 | (DE) . |
| 1204647 | 9/1970 | (GB) . |

OTHER PUBLICATIONS

Brochure—The Simple Solution For Those Peak Volume Periods Highland Supply Corporation. ©1989.
Brochure—Speed Sheets & Speed Rolls, Highland Supply Corporation, ©1990, 2 pages.
LePlant SAC Advertisement, published prior to Sep. 26, 1987.

*Primary Examiner*—Charles T. Jordan
*Assistant Examiner*—Francis T. Palo
(74) *Attorney, Agent, or Firm*—Dunlap, Codding & Rogers, P.C.

(57) ABSTRACT

A method of forming a decorative cover, a sleeve or a preformed pot cover for a floral grouping or flower pot from a sheet of material having a printed pattern thereon wherein the printed pattern contains shaded and highlighted areas which provide the printed pattern with a visual perception of depth and thus a three-dimensional appearance.

6 Claims, 6 Drawing Sheets

U.S. PATENT DOCUMENTS

| | | |
|---|---|---|
| 4,963,218 | 10/1990 | Rainey . |
| 5,111,638 | 5/1992 | Weder . |
| 5,147,706 | 9/1992 | Kingman . |
| 5,154,765 | 10/1992 | Armanini . |
| 5,181,745 * | 1/1993 | Jacobsen et al. .................. 283/94 |
| 5,204,160 | 4/1993 | Rouser . |
| 5,228,234 | 7/1993 | deKlerk et al. . |
| 5,235,782 | 8/1993 | Landau . |
| 5,245,814 | 9/1993 | Weder . |
| 5,307,605 | 5/1994 | Straeter . |
| 5,335,476 | 8/1994 | Weder . |
| 5,369,934 | 12/1994 | Weder . |
| 5,381,642 | 1/1995 | Weder et al. . |
| 5,388,386 | 2/1995 | Weder . |
| 5,388,694 | 2/1995 | Gilbert . |
| 5,388,695 * | 2/1995 | Gilbert .................. 206/423 |
| 5,408,803 | 4/1995 | Weder et al. . |
| 5,428,939 | 7/1995 | Weder et al. . |
| 5,448,875 | 9/1995 | Weder . |
| 5,456,056 | 10/1995 | Weder . |
| 5,465,551 | 11/1995 | Weder . |
| 5,467,573 | 11/1995 | Weder et al. . |
| 5,496,262 | 3/1996 | Gilbert . |
| 5,533,319 | 7/1996 | Weder . |
| 5,533,320 | 7/1996 | Weder . |
| 5,537,799 | 7/1996 | Straeter . |
| 5,537,800 | 7/1996 | Weder . |
| 5,594,048 | 1/1997 | Weder et al. . |
| 5,647,168 | 7/1997 | Gilbert . |
| 5,661,951 | 9/1997 | Weder . |
| 5,720,151 | 2/1998 | Weder . |
| 5,720,152 | 2/1998 | Weder . |
| 5,720,155 | 2/1998 | Weder . |
| 5,727,362 | 3/1998 | Weder . |
| 5,727,363 | 3/1998 | Weder . |
| 5,752,360 | 5/1998 | Weder . |
| 5,775,057 | 7/1998 | Weder . |
| 5,839,255 * | 11/1998 | Weder .................. 53/397 |
| 5,861,199 | 1/1999 | Weder . |
| 5,921,061 | 7/1999 | Weder . |

\* cited by examiner

FLORAL WRAPPER HAVING PRINTED DESIGN WITH SHADED AND HIGHLIGHTED AREAS

CROSS REFERENCE TO RELATED APPLICATIONS

This application is a continuation of U.S. Ser. No. 09/374,464, filed Aug. 13, 1999, now abandoned; which is a divisional application of U.S. Ser. No. 09/021,216, filed Feb. 10, 1998, now abandoned.

STATEMENT REGARDING FEDERALLY SPONSORED RESEARCH:

Not applicable.

FIELD OF THE INVENTION

The present invention relates to methods of wrapping floral groupings and flower pots with a sheet of material to provide a decorative cover for such floral groupings and flower pots, and more particularly but not by way of limitation to methods of wrapping floral groupings and flower pots with a sheet of material having a printed pattern containing shaded and highlighted areas which provide the printed pattern with a visual perception of depth and thus a three dimensional appearance. In one aspect, the present invention relates to a sheet of material having a printed pattern thereon for providing a decorative sleeve, a preformed pot cover or a decorative cover for a flower pot or floral grouping wherein the printed pattern has shaded and highlighted areas which provide the printed design with a visual perception of depth.

DESCRIPTION

The present invention comprises methods of wrapping floral groupings, flower pots containing potted plants, or other pots with a sheet of material having a printed pattern thereon to provide a decorative cover or sleeve for such floral groupings, flower pots containing potted plants or other pot means wherein the printed pattern contains shaded and highlighted areas which provide the printed pattern with a visual perception of depth and thus a three dimensional appearance. In one aspect, the present invention comprises a sheet of material having a printed pattern thereon for providing a decorative cover for a floral grouping or a flower pot or other pots, a sleeve or a preformed pot cover wherein the printed pattern contains shaded and highlighted areas which provide the printed pattern with a visual perception of depth and thus a three dimensional appearance.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the "floral grouping" may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "flower pot" as used herein refers to any type of container for holding a floral grouping, or a plant, or even another pot type container. Examples of flower pots and/or pot type containers include, but are not limited to, clay pots, wooden pots, plastic pots, pots made from natural mad/or synthetic fibers, or any combination thereof. Such flower pots and or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of material having the printed pattern printed thereon if the sleeve is adapted to contain a medium.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singularly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "polymer film" when used herein means a synthetically derived polymer, such as a polypropylene, or a naturally occurring polymer such as cellophane. A polymer film is relatively strong and not as subject to tearing (substantially non-tearable), as might be the case with paper or foil.

"Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The term "bonding material" when used herein can mean an adhesive, frequently a pressure sensitive adhesive, or a cohesive or any adhesive/cohesive combination, having adhesive qualities (i.e., qualities of adhesion or adhesion/ cohesion, respectively) sufficient to cause the attachment of a portion of the sheet of material to itself, to a floral grouping, or to a flower pot. Since the bonding material may comprise either an adhesive or an adhesive/cohesive combination, it will be appreciated that both adhesives and cohesives are known in the art, and both are commercially available. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material [or bonding means]" when used herein also means any type of material or thing which can be used to effect the bonding or connecting of the two adjacent portions of the material or sheet of material to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical apparatus, chemical welding apparatus, magnetic apparatus, mechanical or barb-type fastening apparatus or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

"Detaching element" as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

Description of FIGS. 1–9

Figure 1:
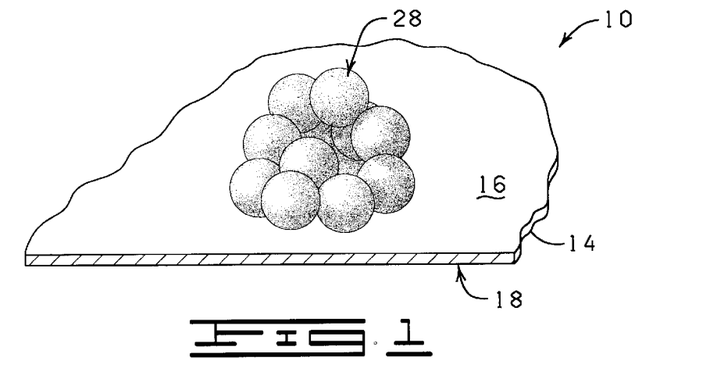
FIG. 1 is an enlarged, fragmental, perspective view of a sheet of material for providing a decorative cover for a floral grouping or a flower pot, a decorative sleeve or a preformed pot cover in accordance with the present invention, the sheet of material having a printed pattern thereon wherein the printed pattern contains shaded and highlighted areas which provide the printed pattern with a visual perception of depth and thus a three dimensional appearance.
Figure 2:
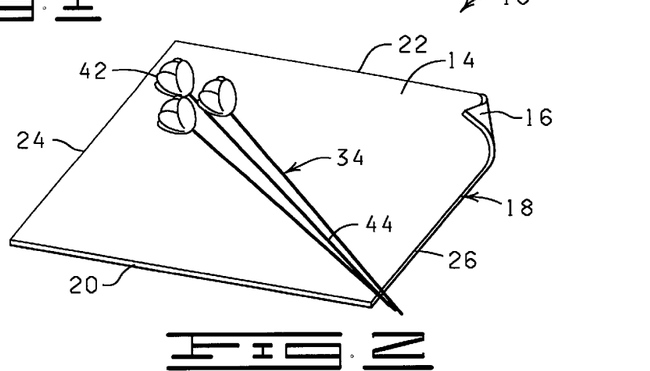
FIG. 2 is a perspective view of the sheet of material of FIG. 1 having a floral grouping disposed thereon.

Referring now to FIGS. 1 and 2, designated generally by the reference numeral 10 is a sheet of material having an upper surface 14, a lower surface 16, and an outer peripheral edge 18. As shown in FIG. 2, the outer peripheral edge 18 of the sheet of material 10 comprises a first side 20, a second side 22, a third side 24, and fourth side 26. A bonding material 27 (FIGS. 3 and 4) may be disposed on at least a portion of one or both surfaces of the sheet of material 10, such as the upper surface 14 thereof as shown and as further illustrated in U.S. Pat. No. 5,181,364, the specification of which is hereby expressly incorporated herein by reference.

The sheet of material 10 has a printed pattern 28 on at least a portion of one of the upper or lower surfaces 14 and 16 thereof, such as the lower surface 16 as shown in FIGS. 1 and 4–6. The printed pattern 28, which contains shaded and highlighted areas so as to provide the printed pattern with a visual perception of depth and thus a three dimensional appearance, may be of any geometrical shape or design which will enhance the aesthetic qualities of a decorative cover 36 and 36a (FIGS. 5 and 6, respectively) formed from the sheet of material 10. That is, the printed pattern 28 may be a lace pattern, curlicues, paisleys, swirls, squiggles, and any shape generally associated with botanical items such as leaves, petals, stems, roots, fruits and any other biomorphic shapes.

The printed pattern 28 is produced by printing a web or sheet of material with different colors of ink so that at least one portion of the printed pattern 28 is printed in one color and other portions of the printed pattern 28 are printed in different colors which results in the printed pattern 28 having the desired shaded and highlighted areas. By providing the printed pattern 28 with shaded and highlighted areas, the printed pattern 28 has a three dimensional appearance due to the depth perception created in the printed pattern 28 by the shaded and highlighted areas in the printed pattern 28. The printed pattern 28 may cover only a portion of the sheet of material 10, or may cover an entire surface of the sheet of material 10, or may cover all exposed and/or interior surfaces of the sheet of material 10.

The ink compositions applied to a web or sheet of material 10 to produce the sheet of material 10 having the printed pattern 28 containing shaded and highlighted areas can be any ink compositions, either solvent-based or water-based, which are compatible with the sheet of material 10. Such ink compositions are well known in the printing art. However, for environmental reasons it is preferred that the ink compositions be water-based ink compositions.

Water-based ink compositions which can be employed to produce the printed pattern 28 on the sheet of material 10, wherein the printed pattern 28 contains shaded and highlighted areas which create the desired visual perception of depth to the printed pattern 28, are disclosed in U.S. Pat. No. 5,594,048, the specification of which is hereby expressly incorporated in its entirety herein by reference.

The ink compositions may be applied to the sheet of material 10 in any conventional manner. The method of application may be manual or mechanical. If the material is in the form of a roll, then gravure, flexographic procedures, or Mayer rod procedures may be used to apply the ink compositions to the material which, when cut into sheets of material provide the sheets of material 10 having the printed pattern 28 thereon. The ink forming the printed pattern 28 is provided in a substantially two-dimensional arrangement.

Figures 17, 18:
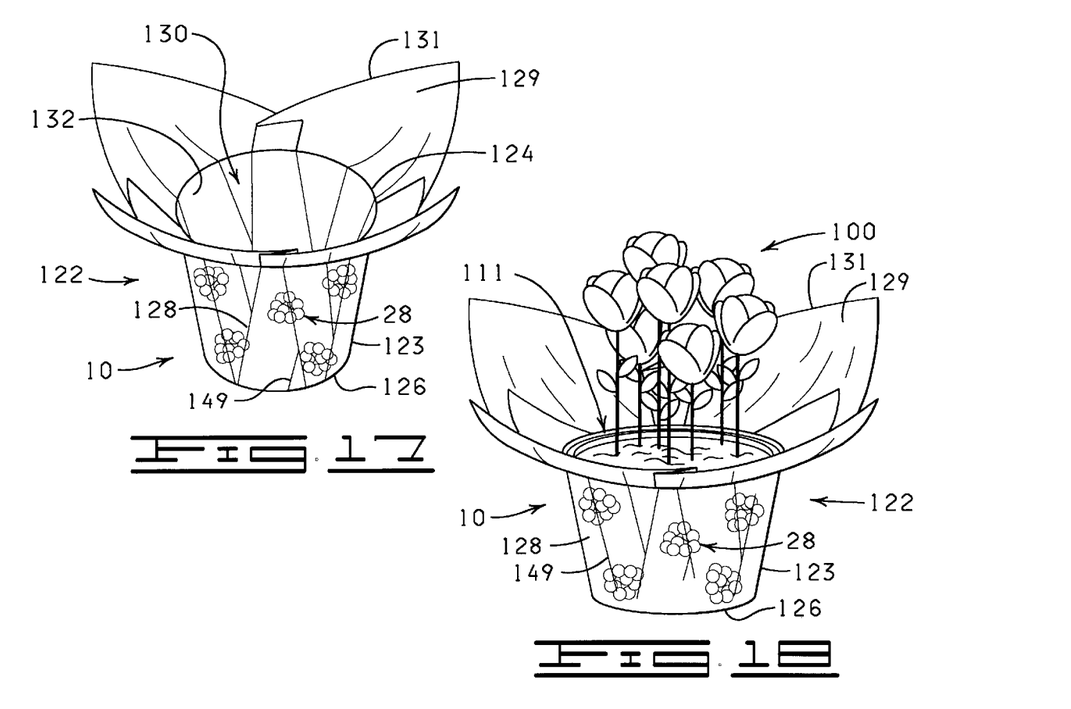
FIG. 17 is a perspective view of a preformed pot cover formed from a sheet of material having a printed pattern containing shaded and highlighted areas which produce a visual perception of depth and thus provides the printed pattern with a three dimensional appearance.
FIG. 18 is a perspective view of the preformed pot cover of FIG. 17 having a flower pot disposed therein.

The sheets of material 10 having the printed pattern 28 containing shaded and highlighted areas may then be employed to provide a decorative cover for a floral grouping 34 (FIGS. 5 and 6) or a decorative cover 62 for a flower pot (FIG. 8); or the sheet of material 10 may be employed to provide a sleeve 86, 86a for wrapping or covering a floral grouping (FIGS. 11 and 13) or a flower pot (FIGS. 15 and 16); or the sheet of material 10 may be employed to form a preformed flower pot cover 122 for covering a flower pot (FIGS. 17 and 18). The use of the sheet of material 10 having the printed pattern 28 to form a decorative cover for a floral grouping or a flower pot, to form a sleeve for a floral grouping or a flower pot, or to form a preformed flower pot cover will be described in more complete detail hereinafter.

As noted above, the sheet of material 10 having the printed pattern 28 containing shaded and highlighted areas which provide the printed pattern 28 with a visual perception of depth and thus a three dimensional appearance can be utilized to form a decorative cover for a floral grouping or a flower pot.

In the embodiments shown in the drawings, the sheet of material 10 having the printed pattern 28 thereon is a square sheet of material. It will be appreciated, however, that the sheet of material 10 having the printed pattern 28 can be of any shape, configuration or size as long as the sheet of material 10 is sufficiently sized and shaped to wrap and encompass a flower pot or a floral grouping. For example, the sheet of material 10 may have a rectangular, round, oval, octagonal or asymmetrical shape. Further, multiple sheets of material 10 may be used in a single circumstance to provide a decorative cover or sleeve for a flower pot or a floral grouping. Moreover, when multiple sheets of material 10 are used in combination, the sheets of material 10 need not be uniform in size or shape. Finally, it will be appreciated that the sheet of material 10 having the printed pattern 28 shown in all embodiments herein is a substantially flat sheet and the ink compositions applied to the sheet of material 10 are of substantially uniform thickness, whereby the shaded and highlighted areas of the printed pattern 28 are produced by the application of different colors of ink to create the visual perception of depth and thus the three dimensional appearance of the printed pattern 28.

Any thickness or stiffness of the sheet of material 10 may be utilized in accordance with the present invention as long as the sheet of material 10 having the printed pattern 28 containing shaded and highlighted areas printed thereon may be wrapped about at least a portion of a flower pot or a floral grouping, as described herein. Stiffer sheets of material 10 may be used if such stiffer sheets of material 10 are scored to facilitate folding. The sheet of material 10 preferably has a thickness of from about 0.1 mil to about 30 mil. Typically, the sheet of material 10 has a thickness in a range of about 0.5 mil to about 2.5 mil.

The sheet of material 10 is constructed from any suitable wrapping material that is capable of being wrapped about a flower pot or floral grouping. Preferably, the sheet of material 10 is paper (untreated or treated in any manner), cellophane, metal foil, polymer film, non-polymer film, fabric (woven or nonwoven or synthetic or natural), cardboard, burlap, or laminations or combinations thereof.

The sheet of material 10 may also be constructed, in whole or in part, from a cling material. The cling material is constructed and treated if necessary, from polyethylene such as Cling Wrap made by Glad®, First Brands Corporation, Danbury, Conn. The thickness of the cling material will, in part, depend upon the size of sleeve and the size of the flower pot in the sleeve, i.e., generally, a larger flower pot may require a thicker and therefore stronger cling material. The cling material will have a thickness of at least about 0.1 mil, and preferably a thickness of from about 0.5 mil to about 2.5 mil. However, any thickness of cling material may be utilized in accordance with the present invention which permits the cling material to be printed with ink compositions so as to provide the cling material with a printed pattern having shaded and highlighted areas which produce a visual perception of depth and thus a three dimensional appearance to the printed pattern.

In one embodiment, a sleeve may be constructed from two polypropylene films wherein at least a lower or outer surface of one of the sheets of polypropylene film is provided with a printed pattern having shaded and highlighted areas which provide the printed pattern with a three dimensional appearance due to the visual perception of depth created by the shaded and highlighted areas of the printed pattern. The sheets of polypropylene film having such printed pattern may be connected together or laminated or may be separate sheets. In an alternative embodiment, the sleeve may be constructed from only one sheet of polypropylene film having a printed pattern containing shaded and highlighted areas thereon.

The sheet of material 10 may vary in color. Further, the sheet of material 10 may comprise other decorative patterns or designs in addition to the printed pattern 28 which are printed, etched, and/or embossed thereon. In addition, the sheet of material 10 may have various colorings, coatings, flocking and/or metallic finishes, applied separately or simultaneously or may be characterized totally or partially by pearlescent, opaque, translucent, transparent, tinted, iridescent or the like, qualities. Each of the above-named characteristics may occur alone or in combination. Moreover, each surface of the sheet of material 10 may vary in the combination of such characteristics.

Figure 3:
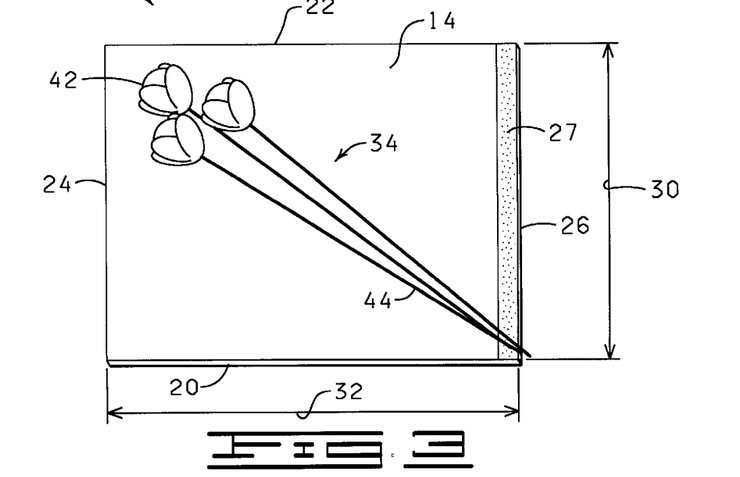
FIG. 3 is a perspective view of a sheet of material having a printed pattern containing shaded and highlighted areas (shown in FIG. 4) and having a bonding material disposed along one edge thereof and a floral grouping disposed on the sheet of material.

Referring more specifically to FIG. 3, the sheet of material 10 has a width 30 extending generally between the first side 20 and the second side 22; and a length 32 extending generally between the third side 24 and the fourth side 26. The sheet of material 10 is sufficiently sized so that the sheet of material 10 extends over a substantial portion of the floral grouping 34 when the sheet of material 10 has been wrapped about the floral grouping 34 in accordance with the present invention, as described in detail herein. The sheet of material 10 may also be wrapped about a flower pot to substantially wrap and cover the flower pot in accordance with the present invention.

A plurality of sheets of material 10 may be connected together to form a roll as is shown in U.S. Pat. No. 5,459,976, the specification of which is hereby expressly incorporated herein in its entirety by reference.

The wrapping of the sheet of material 10 having the printed pattern 28 thereon about the floral grouping 34 to provide a decorative cover 36 for the floral grouping 34 will now be described with reference to FIGS. 3–6. The three dimensional appearance of the printed pattern 28 is produced by application of ink compositions to the sheet of material 10 in such a manner that the printed pattern 28 is provided with shaded and highlighted areas which provide the printed pattern 28 with a perception of depth. The sheet of material 10 (which may optionally have the strip of bonding material 27 disposed upon the upper surface 14, the lower surface 16 or both, such as the strip of bonding material 27 disposed along at least a portion of the upper surface 14 so as to be disposed substantially adjacent the fourth side 26 of the sheet of material 10 as shown in FIGS. 3 and 4) is provided, either as an individual sheet or from a pad or rolls by any means or otherwise as described herein.

The bonding material 27, if present, may have a backing or release strip (not shown). The backing or release strip may be left applied for a period of time to the bonding material 27 after it is disposed on a surface of the sheet of material 10 prior to its use as a wrapping material, to protect the bonding qualities of the bonding strip. In operation, an operator may dispose the sheet of material 10 on a support surface (not shown), the lower surface 16 of the sheet of material 10 contacting the support surface.

Referring more specifically to FIG. 3, the floral grouping 34 is placed upon the upper surface 14 of the sheet of material 10 in a diagonal orientation. The floral grouping 34 has an upper bloom or foliage portion 42 and a lower stem portion 44.

Figure 4:
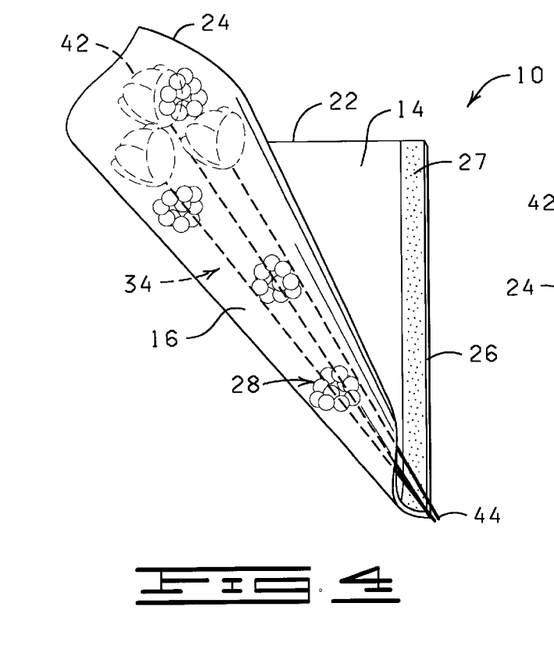
FIG. 4 is a perspective view of the floral grouping being wrapped with the sheet of material having a printed pattern containing shaded and highlighted areas of FIG. 3 by one method of wrapping the sheet of material about the floral grouping.
Figure 5:
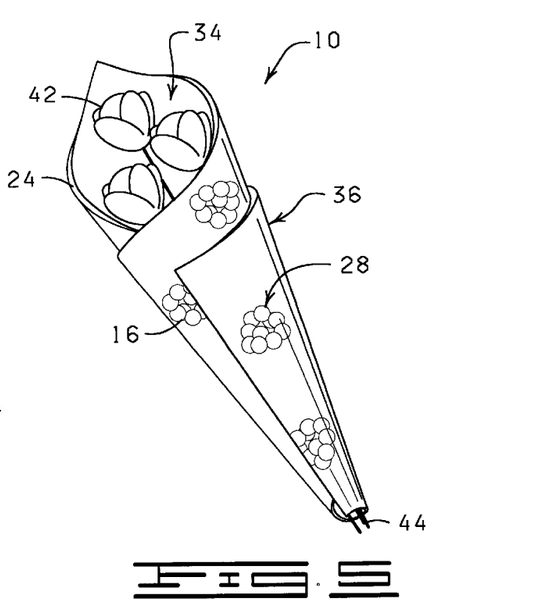
FIG. 5 is a perspective view of a decorative cover for the floral grouping formed from the sheet of material of FIG. 3 wherein the decorative cover formed from the sheet of material has a conical configuration.

As illustrated in FIGS. 4 and 5, the sheet of material 10 is then wrapped about the floral grouping 34 by the operator, the operator overlapping a portion of the sheet of material 10 over another portion of the sheet of material 10. That is, for example, the operator places the first side 20 of the sheet of material 10 over the floral grouping 34, as shown in FIG. 4. The operator continues to roll the floral grouping 34 and the sheet of material 10 in the direction toward the second side 22 of the sheet of material 10 until the upper surface 14 near second side 22 firmly engages the lower surface 16 of the sheet of material 10, whereby the floral grouping 34 is substantially encompassed by the sheet of material 10, and wherein the bonding material 27 contacts a portion of the overlapped sheet of material 10 to provide the decorative cover 36 which substantially encompasses and surrounds a substantial portion of the floral grouping 34. FIG. 5 shows the floral grouping 34 wrapped in a conical fashion with the bloom end 42 exposed near the open upper end of the decorative cover 36 and the stem end 44 exposed near the lower end of the decorative cover 36.

Figures 6, 7:
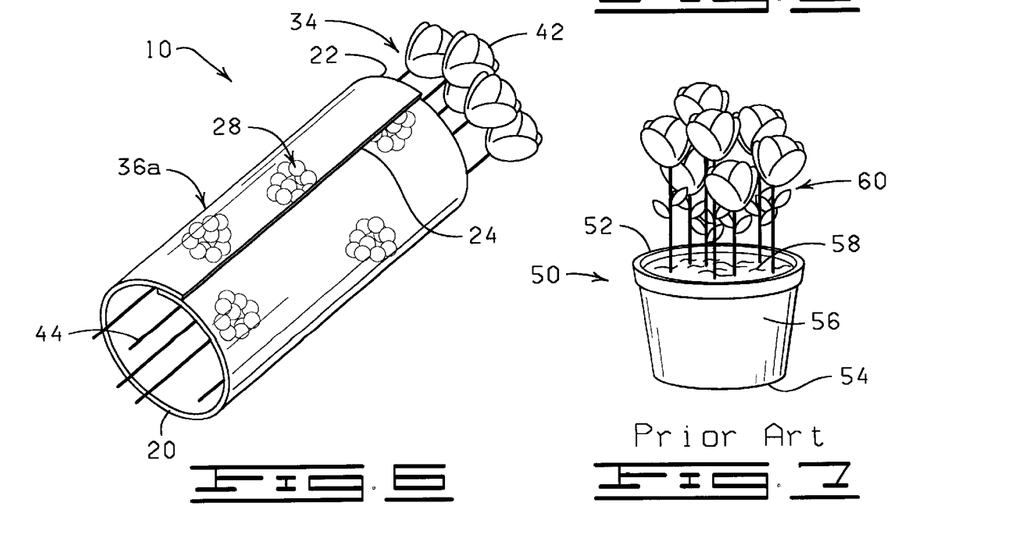
FIG. 6 is a perspective view of a decorative cover formed from the sheet of material of FIG. 3 wherein the floral grouping is wrapped with the sheet of material by a second method of wrapping so that the decorative cover formed from the sheet of material has a substantially cylindrical configuration.
FIG. 7 is a perspective view of a flower pot containing a potted plant.

In another embodiment, illustrated in FIG. 6, the sheet of material 10 having the printed pattern 28 is utilized to wrap the floral grouping 34. The floral grouping 34 is disposed upon the sheet of material 10 approximately parallel to third side 24 of the sheet of material 10. The sheet of material 10 is then wrapped generally about the stem portion 44 of the floral grouping 34 to a position wherein the third side 24 of the sheet of material 10 generally overlaps the fourth side 26 of the sheet of material 10 in a cylindrical fashion. It should be noted that the sheet of material 10 may be wrapped a plurality of times about the stem portion 44 of the floral grouping 34 before the overlapping of the third side 24 and the fourth side 26 of the sheet of material 10. As before, the portion of the sheet of material 10 near the third side 26 is disposed generally adjacent another portion of the sheet of material 10 and the two adjacent portions then are brought into contact where they may be bondingly engaged, thereby securing the sheet of material 10 generally about the floral grouping 34 so as to provide a decorative cover 36a for the floral grouping 34.

In another embodiment of the invention, the sheet of material 10 having the printed pattern 28 thereon may be used to wrap a flower pot or pot-type container, as noted above. Shown in FIG. 7 is a flower pot designated by the reference numeral 50, which has an open upper end 52, a bottom end 54, an outer peripheral surface 56, and an inner retaining space 58 within which may be disposed a growing medium. The flower pot 50 may contain a botanical item, such as a plant 60.

Figure 8:
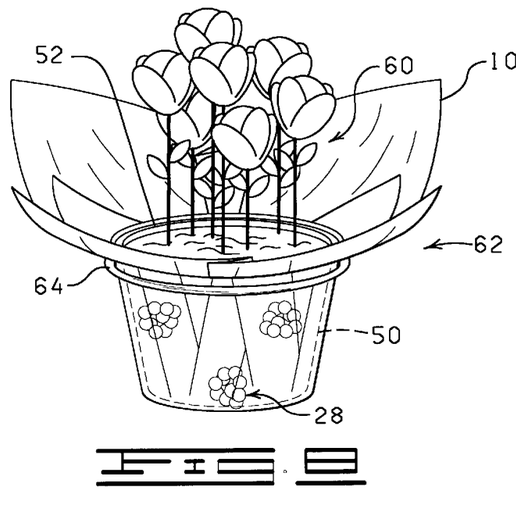
FIG. 8 is perspective view of a decorative cover positioned about the flower pot of FIG. 7 wherein the decorative cover is formed from a sheet of material having a printed pattern containing shaded and highlighted areas so as to provide the printed pattern with a visual perception of depth.

The sheet of material 10 having the printed pattern 28 thereon may be wrapped about the flower pot 50 by any one of numerous methods used to wrap sheets of material about flower pots to form decorative pot covers for flower pots, such as a decorative cover 62 disposed about the flower pot 50 illustrated in FIG. 8. The sheet of material 10 may, for example, be formed by hand about the outer peripheral surface 56 (see FIG. 7) of the flower pot 50 to produce the decorative cover 62. The decorative cover 62 can then be secured about the flower pot 50 by a bonding material, such as elastic band 64, so that the open upper end 52 of the flower pot 50 remains substantially uncovered by the decorative cover 62.

Figure 9:
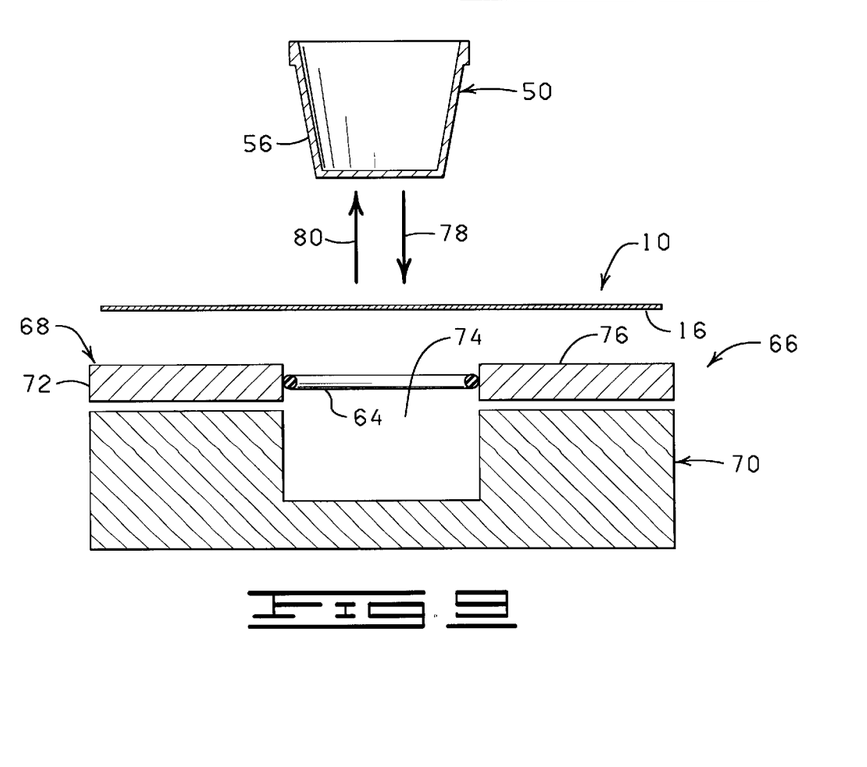
FIG. 9 is a cross-sectional view of a flower pot cover former and band applicator apparatus having the sheet of material of FIG. 2 disposed above an opening of the flower pot cover former and band applicator and having a flower pot disposed above the sheet of material.

Referring now to FIG. 9, a flower pot cover former and band applicator apparatus 66 for forming the sheet of material 10 into the decorative cover 62 for the flower pot 50 is illustrated. The flower pot cover former and band applicator device 66 comprises a band applicator 68 and a flower pot cover former 70. The flower pot cover former and band applicator device 66 has a support platform 72 with an opening 74 formed therein. A band, such as elastic band 64, is disposed circumferentially about the opening 74 in the support platform 72.

The lower surface 16 of the sheet of material 10 is positioned on an upper surface 76 on the support platform 72 such that the sheet of material 10 is positioned over the opening 74 in the support platform 72. The flower pot 50 is then positioned above the sheet of material 10 and is moved in a direction 78 into the opening 74 of the flower pot cover former and band applicator device 66. As the flower pot 50 is moved into the opening 74, the sheet of material 10 is pressed about the outer peripheral surface 56 of the flower pot 50 thereby forming the decorative cover 62 about the flower pot 50. The decorative cover 62 is then secured about the flower pot 50 by the elastic band 64. The flower pot 50 having the decorative cover 62 secured thereto is then moved in a direction 80 out of the opening 74 in the support platform 72.

The elastic band 64 can be applied manually or automatically such as by the method shown in U.S. Pat. No. 5,105,599, which is hereby incorporated herein by reference. The band 64 can be applied as a tie using a method such as described in U.S Pat. No. 5,609,009, the specification of which is hereby incorporated herein by reference. The sheet of material 10 can be applied automatically about the flower pot 50, for example, by methods shown in U.S. Pat. Nos. 4,733,521 and 5,291,721, both of which are hereby incorporated herein by reference.

Instead of securing the decorative cover 62 about the flower pot 50 via the band 64, the decorative cover 62 formed from the sheet of material 10 may be secured to the flower pot 50 by the use of one or more bonding materials. For example, the upper surface 14 of the sheet of material 10 may have a bonding material disposed upon a portion thereof. When the sheet of material 10 is disposed about the flower pot 50, at least a portion of the upper surface 14 of the sheet of material 10 contacts the outer peripheral surface 56 of the flower pot 50 and is thereby bonded and held about the flower pot 50 via the bonding material.

The bonding material may cover a portion of the upper surface 14 of the sheet of material 10 or the bonding material may entirely cover the upper surface 14 of the sheet of material 10. The bonding material may be disposed on the upper surface 14 of the sheet of material 10 in the form of a strip or in the form of spaced-apart spots. One method for disposing a bonding material on the sheet of material 10 is described in U.S. Pat. No. 5,111,637, which is expressly incorporated herein by reference.

Description of FIGS. 10–16

Figure 10:
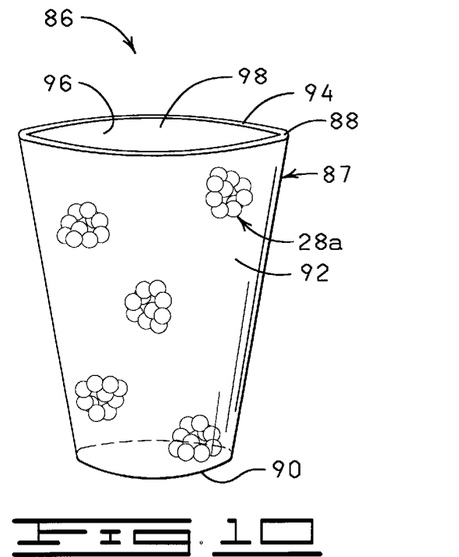
FIG. 10 is a perspective view of a floral sleeve formed from a sheet of material having a printed pattern containing shaded and highlighted areas so as to provide the printed pattern with a visual perception of depth.

Shown in FIG. 10 is a decorative cover designated therein by the general reference numeral 86 which comprises a flexible bag or sleeve 87 of unitary construction having a printed pattern 28a printed thereon in accordance with the present invention. The sleeve 87 may be used to provide the decorative cover 86 for a floral grouping or a flower pot. The sleeve 87 initially comprises a flexible flat collapsed piece of material which is openable in the form of a tube or sleeve. Such sleeves are well known in the floral industry. Further, in accordance with the present invention, the sleeve 87 has the printed pattern 28a, as previously described herein, printed upon at least a portion thereof. That is, the printed pattern 28a is provided with shaded and highlighted areas which produce a three dimensional appearing pattern due to the visual perception of depth created by the shaded and high-lighted areas in the printed pattern 28a. The sleeve 87 has an upper end 88, a lower end 90 and an outer peripheral surface 92. The sleeve 87 may be tapered outwardly from the lower end 90 toward a larger diameter at its upper end 88. In its flattened state the sleeve 87 generally has an overall trapezoidal or modified trapezoidal shape and when opened is substantially frusto-conical to coniform. It will be appreciated, however, that the sleeve 87 may comprise variations on the aforementioned shapes or may comprise significantly altered shapes such as square or rectangular, wherein the sleeve 87 when opened has a cylindrical form, as long as the sleeve 87 functions in accordance with the present invention in the manner described herein. The sleeve 87 (or any other sleeve disclosed herein) may have an angular or contoured shape.

The sleeve 87 has an opening 94 at the upper end 88 and may be open at the lower end 90, or closed with a bottom at the lower end 90. The sleeve 87 also has an inner peripheral surface 96 which, when the sleeve 87 is opened, defines and encompasses an inner retaining space 98. When the lower end 90 of the sleeve 87 has a closed lower end 90, a portion of the lower end 90 may be inwardly folded to form one or more gussets (not shown) for allowing the lower portion of the inner retaining space 98 to be expandable, for example, for receiving the circular bottom of a pot or growing medium.

The sleeve 87 is generally frusto-conically shaped, but the sleeve 87 may be, by way of example but not by way of limitation, cylindrical, frusto-conical, a combination of both frusto-conical and cylindrical, or any other shape, as long as the sleeve 87 functions as described herein as noted above. Further, the sleeve 87 may comprise any shape, whether geometric, non-geometric, asymmetrical and/or fanciful as long as it functions in accordance with the present invention. The sleeve 87 may also be equipped with drain holes (if having a closed bottom) or side ventilation holes (not shown), or can be made from gas permeable or impermeable materials.

The material from which the sleeve 87 is constructed is the same as previously described above for the sheet of material 10. Such materials used to construct the sleeve 87 are further described in U.S. Pat. No. 5,111,637, which is expressly incorporated herein by reference. Any thickness of material may be utilized in accordance with the present invention as long as the sleeve 87 may be formed as described herein, and as long as the formed sleeve 87 may contain at least a portion of a flower pot or a floral grouping, as described herein. Additionally, an insulating material such as bubble film, preferable as one of two or more layers, can be utilized in order to provide additional protection for the item, such as the floral grouping, contained therein.

Figures 11, 12, 13:
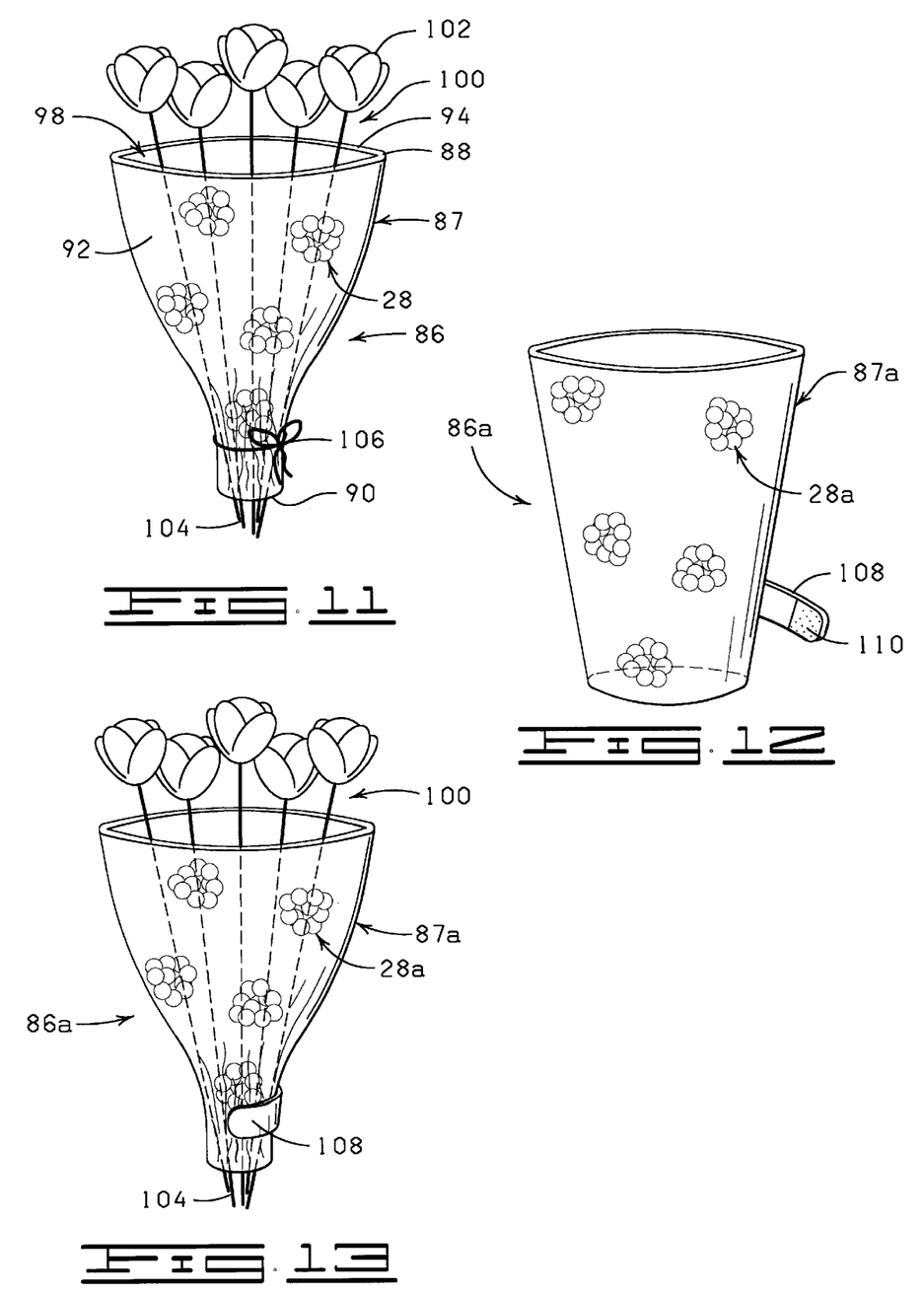
FIG. 11 is a perspective view of the floral sleeve of FIG. 10 disposed about a floral grouping.
FIG. 12 is a perspective view of a floral sleeve having a cinching member wherein the floral sleeve is formed from a sheet of material having a printed pattern containing shaded and highlighted areas so as to provide the printed pattern with a visual perception of depth.
FIG. 13 is a perspective view of the floral sleeve of FIG. 12 disposed about a floral grouping.

In FIG. 11 the sleeve 87 is illustrated having the printed pattern 28 printed on the outer peripheral surface 92 of the sleeve 87. A floral grouping 100 is disposed within the inner retaining space 98 of the sleeve 87. Generally, an upper or bloom portion 102 of the floral grouping 100 is exposed near the opening 94 of the sleeve 87 and a lower or stem portion 104 of the floral grouping 100 is exposed near the lower end 90 of the sleeve 87. Either end of the sleeve 87 may be closed about the floral grouping 100. Generally, a portion of the sleeve 87 is tightened about a portion of the stem portion 104 of the floral grouping 100 for holding the decorative cover 86 about the floral grouping 100. For example, the sleeve 87 may be held by a tie 106 tied about the sleeve 87 such as is shown in FIG. 11. Other means for binding a sleeve about a floral grouping may be employed such as the bonding means and materials described elsewhere herein.

Similarly, it may generally be desired to use the sleeve 87 as a decorative cover for a flower pot (not shown). The flower pot will generally contain a botanical item or plant. The flower pot can be deposited into the open sleeve 87 in a manner well known in the art, such as manually wherein the sleeve 87 is opened by hand and the flower pot deposited therein.

As noted above, a bonding material may be disposed on a portion of the sleeve 87 or any sleeve described herein to assist in holding the sleeve 87 to the flower pot when the flower pot is disposed within the sleeve 87 or to assist in closing the upper end 88 of the sleeve 87 or adhering the sleeve 87 to the flower pot after the flower pot has been disposed therein, as will be discussed in further detail below.

It will be understood that the bonding material, if present, may be disposed as a strip or block on a surface of the sleeve 87. The bonding material may also be disposed upon either the outer peripheral surface 92 or the inner peripheral surface 96 of the sleeve 87, as well as upon the flower pot. Further, the bonding material may be disposed as spots of bonding material, or in any other geometric, non-geometric, asymmetric, or fanciful form, and in any pattern including covering either the entire inner peripheral surface 96 and/or outer peripheral surface 92 of the sleeve 87 and/or the flower pot. The bonding material may be covered by a cover or release strip which can be removed prior to the use of the sleeve 87 or flower pot. The bonding material can be applied by means known to those of ordinary skill in their art. One method for disposing a bonding material, in this case an adhesive, is described in U.S. Pat. No. 5,111,637, which is hereby incorporated herein by reference.

As noted above, a bonding material may be disposed on at least a portion of the inner peripheral surface 96 of the sleeve 87 (or any other sleeve described herein), or, alternatively, the bonding material may be disposed on the outer peripheral surface 56 (see FIG. 7) of a flower pot contained within the sleeve 87, while the sleeve 87 may be free of the bonding material. In a further alternative, bonding material may be disposed both on at least a portion of the flower pot as well as upon at least a portion of the inner peripheral surface 96 of the sleeve 87. In addition, a portion of the bonding material may also be disposed on the outer peripheral surface 92 of the sleeve 87 as well. It will be understood that the bonding material may be disposed in a solid section of bonding material. The bonding material, when present, is disposed on the sleeve 87 and/or flower pot by any means known in the art.

Certain embodiments of sleeves described herein may be used in combination with a preformed pot cover. For example, a preformed pot cover may be applied to the pot, then the covered pot wrapped or disposed within a sleeve. Either the cover, the sleeve, or both, may have the printed pattern printed thereon wherein the printed pattern is produced by application of ink compositions to the sheet of material 10 or the sleeve 87 in such a manner that the printed pattern 28 or 28*a* is provided with shaded and highlighted areas which provide the printed pattern 28 or 28*a* with a perception of depth.

As shown in FIG. 12, a decorative cover 86*a* is provided which comprises a sleeve 87*a* having the printed pattern 28*a* printed thereon. The sleeve 87*a* is further provided with a cinching tab 108 having a bonding material 110 disposed upon a surface thereof. The cinching tab 108 can be used to gather portions of the sleeve 87*a* together about the stem portion 104 of the floral grouping 100 as shown in FIG. 13 for holding the sleeve 87*a* tightly about the floral grouping 100.

Examples of sleeves which may be used in the practice of the present invention are disclosed in U.S. Pat. No. 5,625,979, which is expressly incorporated herein by reference in its entirety. Equipment and devices for forming sleeves are commercially available, and well known in the art.

Figures 14, 15, 16:
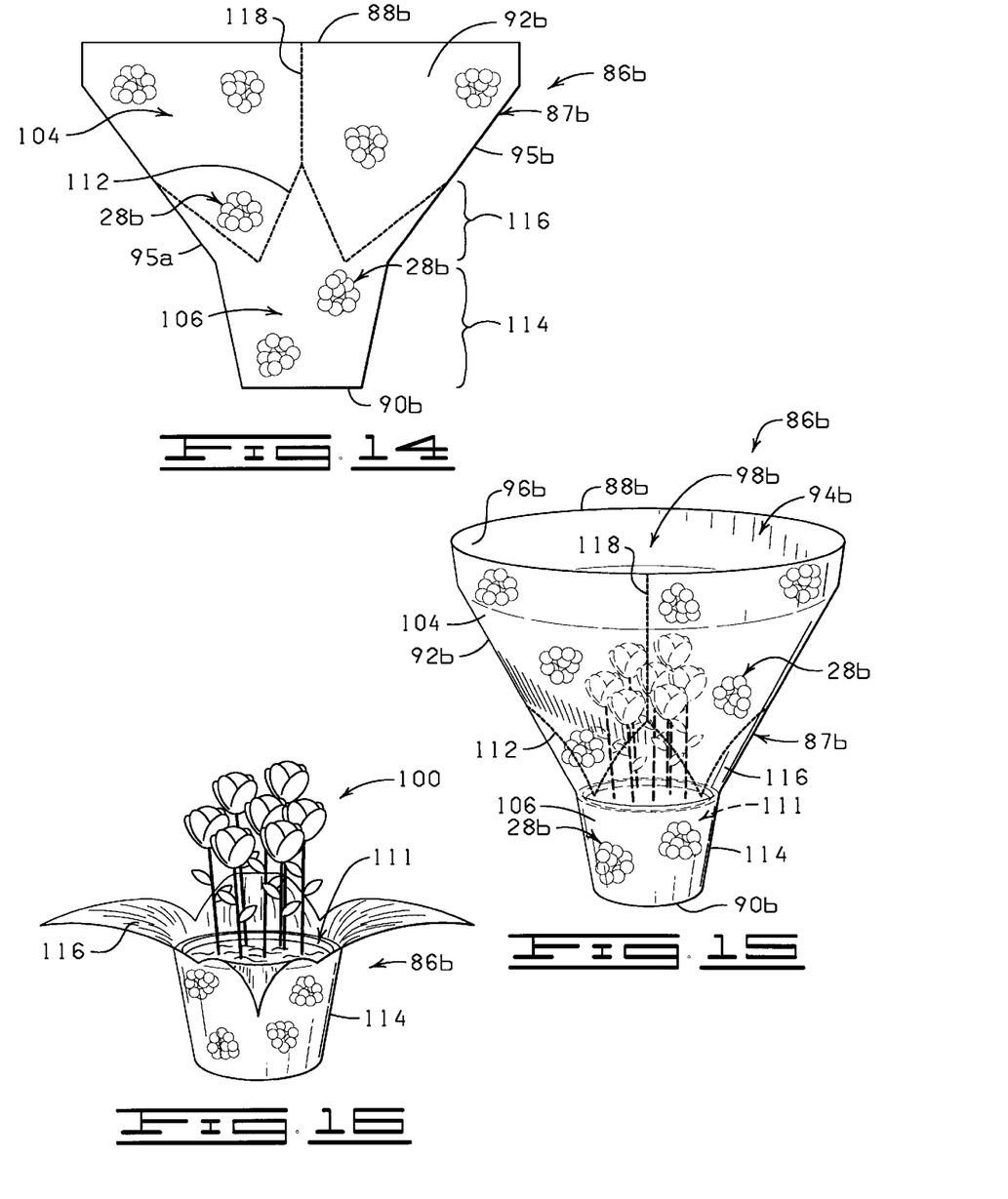
FIG. 14 is a side view of a sleeve having a detachable portion wherein the sleeve is formed from a sheet of material having a printed pattern having a three dimensional appearance which is created by shaded and highlighted areas in the printed pattern.
FIG. 15 is a perspective view of the sleeve of FIG. 14 having a flower pot disposed therein.
FIG. 16 is a perspective view of a flower pot disposed in the sleeve of FIG. 14 wherein an upper portion of the sleeve has been removed to provide a decorative cover having a skirt.

Shown in FIGS. 14 and 15 is another embodiment of a decorative cover 86*b* which comprises a sleeve 87*b* constructed in accordance with the present invention. The sleeve 87*b* has a printed pattern 28*b* printed thereon; and the sleeve 87*b* has a "detaching" element 112 in predetermined areas for detaching a portion of the sleeve 87*b*. The sleeve 87*b* generally initially comprises a flexible, flat, collapsed piece of material which is openable in the form of a tube or sleeve. The sleeve 87*b* is constructed of the same material and in the same way as described previously herein and may be described exactly the same as the other sleeves described herein except for the additional elements described herein.

The sleeve 87*b* has an upper end 88*b*, a lower end 90*b*, and an outer peripheral surface 92*b*. The sleeve 87*b* has an opening 94*b* at the upper end 88*b* thereof, and the sleeve 87*b* may be open at the lower end 90*b* or closed with a bottom at the lower end 90*b*. In a flattened state, the sleeve 87*b* has a first side 95*a* and a second side 95*b*. The sleeve 87*b* also has an inner peripheral surface 96*b* which, when the sleeve 87*b* is opened, defines and encompasses an inner retaining space 98*b* as shown in FIG. 15. When the lower end 90*b* of the sleeve 87*b* has a closed bottom, a portion of the lower end 90*b* may be inwardly folded to form one or more gussets (not shown) for permitting a circular bottom of an object, such as a flower pot 111 (see FIG. 16), to be disposed in the inner retaining space 98*b* of the lower end 90*b* of the sleeve 87*b*.

As shown in FIG. 14 and 15, the sleeve 87*b* is demarcated into an upper portion 104 and a lower portion 106. The lower portion 106 of the sleeve 87*b* is generally sized to contain the flower pot 111. The upper portion 104 of the sleeve 87*b* is sized to substantially surround and encompass a plant 100 contained in the flower pot 111 disposed within the lower portion 106 of the sleeve 87*b*. The sleeve 87*b* is demarcated into the upper portion 104 and the lower portion 106 by a detaching element 112 for enabling the detachment of the upper portion 104 of the sleeve 87*b* from the lower portion 106 of the sleeve 87*b*. In the present embodiment, the detaching element 112 is a plurality of generally laterally-oriented or alternately diagonally-oriented perforations which extend circumferentially across the outer peripheral surface 92b of the sleeve 87b from the first side 95a to the second side 95b.

In a preferred embodiment, as shown in FIGS. 14 and 15, the lower portion 106 of the sleeve 87b further comprises a base portion 114 and a skirt portion 116. The base portion 114 comprises that part of the lower portion 106 which, when the flower pot 111 is placed into the lower portion 106, has an inner peripheral surface which is substantially adjacent to and surrounds the outer peripheral surface of the flower pot 111. The skirt portion 116 comprises that part of the lower portion 106 which extends beyond an open upper end of the flower pot 111 and adjacent at least a portion of the plant 100 contained within the flower pot 111 and which is left to freely extend at an angle, inwardly or outwardly, from the base portion 114 when the upper portion 104 of the sleeve 87b is detached from the lower portion 106 of the sleeve 87b by actuation of the detaching element 112.

In the intact sleeve 87b, the skirt portion 116 comprises an upper peripheral edge congruent with the detaching element 112 which is connected to a lower peripheral edge, also congruent with the detaching element 112, of the upper portion 104 of the sleeve 87b. In FIGS. 14 and 15, the upper peripheral edge of the skirt portion 116 is congruent with a series of alternating diagonally-oriented lines of perforations which together form a zig-zag and comprise the detaching element 112. The upper portion 104 of the sleeve 87b may also have an additional detaching element 118 indicated as a plurality of vertical perforations for facilitating removal of the upper portion 104 and which are disposed more or less vertically therein extending between the detaching element 112 and the upper end 88b of the sleeve 87b.

The upper portion 104 of the sleeve 87b is thereby separable from the lower portion 106 of the sleeve 87b by tearing the upper portion 104 along both the vertical perforations 118 and the detaching element 112, thereby separating the upper portion 104 from the lower portion 106 of the sleeve 87b. The lower portion 106 of the sleeve 87b remains disposed as the base portion 114 about the flower pot 111, and as the skirt portion 116 about the plant 100 forming a decorative cover 86b as shown in FIG. 16 which substantially surrounds and encompasses the flower pot 111 and the plant 100 contained therein. The printed pattern 28b, which has shaded and highlighted areas so as to provide the printed pattern 28b with a visual perception of depth and thus provides a three dimensional appearance, may be printed upon only the lower portion 106 of the sleeve 87b, for example, the base and skirt portions 114 and 116, while the upper portion 104 is left unprinted or is printed with another design. When the upper portion 104 is detached, the portion containing the printed pattern 28b remains.

In a general method of use of sleeve 87b as a decorative cover for a flower pot, an operator provides the sleeve 87b and the flower pot 111 having a plant 100 disposed in a growing medium contained within the flower pot 111. The operator then disposes the flower pot 111 having the plant 100 contained therein into the sleeve by opening the sleeve 87b at its upper end 88b and assuring both that the opening 94b therein is in an open condition, and that the inner peripheral surface 96b of the sleeve 87b is somewhat expanded outward as well, as shown in FIG. 15. The operator then manually or automatically disposes the flower pot 111 into the opening 94b in the sleeve 87b, the flower pot 111 being disposed generally through the upper portion 104 of the sleeve 87b into generally the lower portion 106 of the sleeve 87b, the flower pot 111 remaining in the lower portion 106 of the sleeve 87b, permitting the sleeve 87b to substantially surround and tightly encompass the flower pot 111. It will be understood that, alternatively, the sleeve 87b with an extension (not shown) may be utilized, the sleeve 87b being disposed on rods, or wickets (not shown) and the flower pot 111 then being disposed in the sleeve 87b either before or after the sleeve 87b has been removed from the wickets.

Embodiments of FIGS. 17–18

Referring now to FIGS. 17 and 18, a decorative preformed flower pot cover 122 is illustrated constructed from a sheet of material 10 having the printed pattern 28 thereon. As previously described with reference to FIGS. 1 and 2, the printed pattern 28 is produced by application of ink to the sheet of material 10 such that the printed pattern 28 is provided with a three dimensional appearance as a result of a perception of depth created by shaded and highlighted areas created in the printed pattern 28.

The decorative preformed pot cover 122 has a base 123 with an upper end 124, a lower end 126, and an outer peripheral surface 128. A skirt 129 is connected to the upper end 124 of the base 123 so as to extend outwardly from the upper end 124 of the base 123 and terminating with an outer periphery 131. An opening 130 intersects the upper end 124, forming an inner peripheral surface 132 which defines and encompasses a retaining space within which the flower pot 111 containing the floral grouping or plant 100 may be disposed in a manner well known in the art and which is shown in FIG. 18.

The decorative preformed flower pot cover 122 may be constructed of a single sheet of material 10 having the printed pattern 28 printed thereon substantially as shown in FIG. 18, or a plurality of layers of the same and/or different types of material may be employed in the formation of the decorative preformed flower pot cover 122. The thickness of the sheet of material 10 may vary widely and any thickness of the sheet of material 10 may be utilized in accordance with the present invention so long as the sheet of material 10 is formable into the decorative preformed flower pot cover 122 as described herein. When the sheet of material 10 is constructed of a plurality of layers of material, each layer of material may be connected to an adjacent layer of material via a bonding material.

Figure 19:
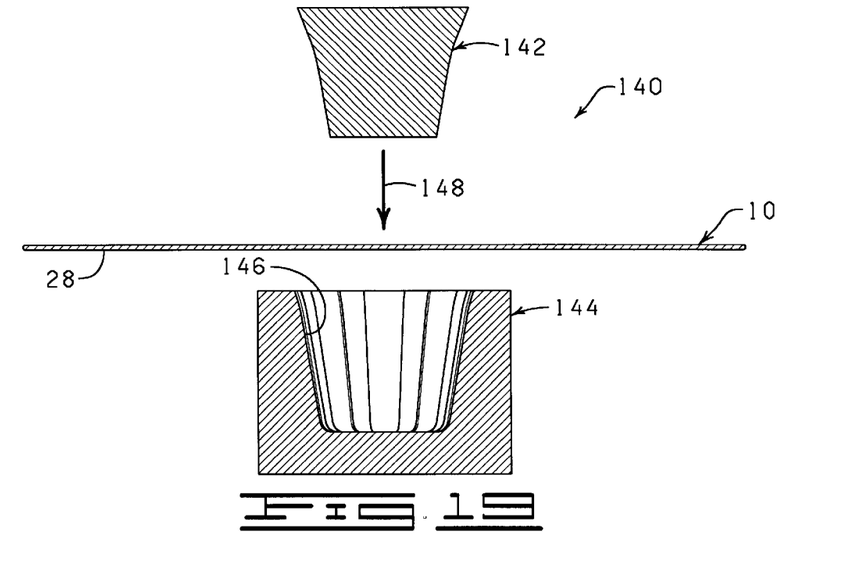
FIG. 19 is a diagrammatic, cross-sectional view of a male and female mold having a sheet of material disposed therebetween for forming the preformed pot cover of FIG. 17.

Referring now to FIG. 19, the decorative preformed flower pot cover 122 may be formed using a conventional mold system 140 comprising a male mold 142 and a female mold 144 having a mold cavity 146 for matingly receiving the male mold 142. The sheet of material 10 having the printed pattern 28 printed thereon is positioned between the male and female molds 142 and 144, respectively. Movement of the male mold 142 in the direction 148 and into the mold cavity 146 forces the sheet of material 10 to be disposed about the portion of the male mold 142 disposed in the mold cavity 146 of the female mold 144 and thereby forms the sheet of material 10 into the preformed decorative flower pot cover 122 (FIG. 18)

Methods for forming such preformed decorative pot covers are well known in the art. Two methods of forming such covers are described in U.S. Pat. Nos. 4,773,182 and 5,291,721, each of which is expressly incorporated herein by reference. It will be noted that in one preferred embodiment, overlapping folds 149 (see FIGS. 17 and 18) are provided and a portion of the overlapping folds 149 can be connected, such as by an application of the bonding material 27, as discussed above, to the sheet of material 10 before forming the sheet of material 10 by way of the conventional mold system 140.

Further, in accordance with the present invention, the preformed flower pot cover 122 is constructed from the same materials described hereinabove, may have a bonding material disposed upon a portion thereof, and has printed upon at least a portion thereof the printed pattern 28 described in detail above.

Changes may be made in the construction and the operation of the various components, elements and assemblies described herein or in the steps or the sequence of steps of the methods described herein without departing from the spirit and scope of the invention as defined in the following claims.

What is claimed:

1. A preformed flower pot cover disposable about a flower pot, the preformed flower pot cover having a printed pattern thereon including shaded and highlighted areas which provides the printed pattern with a three dimensional appearance, the preformed flower pot cover being formed from a substantially flat sheet of material having the printed pattern thereon wherein the printed pattern is formed by application of various colors of ink to at least one surface of the sheet of material, the ink having a substantially uniform thickness and being applied to the sheet of material so as to create a visual perception of depth and thereby providing the three dimensional appearance of the printed pattern on the preformed flower pot cover, the preformed flower pot cover comprising:

a preformed base having the printed pattern containing shaded and highlighted areas, the preformed base being sized to contain the flower pot and having an upper end, a lower end, an outer peripheral surface and a pot opening formed through the upper end thereof for providing access to a pot receiving space; and a skirt connected to the upper end of the preformed base so as to extend a distance outwardly from the upper end of the base and terminating with an outer periphery.

2. The preformed flower pot cover of claim 1 wherein the skirt is provided with a printed pattern thereon, the printed pattern having shaded and highlighted areas to provide the printed pattern on the skirt with a three dimensional appearance due to the visual perception of depth created by the shaded and highlighted areas of the printed pattern.

3. The preformed flower pot cover of claim 1 wherein the upper end of the preformed base is disposable above the upper end of the flower pot when the flower pot is disposed in the pot receiving space and wherein the skirt of the preformed flower pot cover is provided with a printed pattern thereon, the printed pattern having shaded and highlighted areas to provide the printed pattern on the skirt with a three dimensional appearance due to the visual perception of depth created by the shaded and highlighted areas of the printed pattern.

4. The preformed flower pot cover of claim 1 wherein the preformed base is provided with a plurality of overlapping folds.

5. The preformed flower pot cover of claim 4 wherein at least a portion of the overlapping folds in the preformed base are bondingly connected.

6. A preformed flower pot cover disposable about a flower pot comprising:

a preformed base sized to contain the flower pot and having an upper end, a lower end, an outer peripheral surface and a pot opening formed through the upper end thereof providing access to a pot receiving space forming an inner peripheral surface of the base, the preformed pot cover formed of at least one sheet of material having a two-dimensional printed pattern thereon, the printed pattern having shaded and highlighted areas to provide the printed pattern with a three dimensional appearance produced by the shaded and highlighted areas of the printed pattern.

\* \* \* \* \*